RECORDING METHOD AND RECORDER WITH SEQUENTIALLY OPERATED RECORDING ELEMENTS

Filed Feb. 17, 1969

Inventor
JOHN GUZAK, JR.
RAY A. MARSHALL

Mason, Kolehmainen, Rathburn & Wyss
Attorneys 3,532,266

RECORDING METHOD AND RECORDER WITH SEQUENTIALLY OPERATED RECORDING ELEMENTS

John Guzak, Jr., Arlington Heights, and Ray A. Marshall, Park Ridge, Ill., assignors to SCM Corporation, New York, N.Y., a corporation of New York Filed Feb. 17, 1969, Ser. No. 799,765
Int. Cl. G06k 1/05
U.S. Cl. 234—1 14 Claims

ABSTRACT OF THE DISCLOSURE

This application discloses a method of recording and a recorder including a code punch with a number of punch elements which are operated in sequence rather than concurrently so as to reduce the peak power drawn by the punch. Data representing the combination of punches to be operated is stored in bistable circuits which control a series of serially arranged logic gates. The logic gates control the sequential operation of the punches in accordance with the data stored in the bistable circuits. The series arrangement of logic gates is also controlled by the bistable circuits to skip directly from one punch to be operated to the next while passing over the punches that are not to be operated so as to reduce the cycle time of the punch to a minimum. A selectively enabled input to the bistable circuits permits the same circuit arrangement to be used to control recording in either Baudot or ASCII code.

BACKGROUND OF THE INVENTION

Field of the invention

This invention relates to a recording method and apparatus and, more particularly, to new and improved recording method and apparatus for carrying out the method including means for controlling the sequential operation of plural recording elements.

Description of the prior art

Many recorders, such as punches or printers, have plural recording elements which are electrically controlled or operated. If these elements are simultaneously operated, the peak power required by the unit is much larger than it would be if the recording elements could be operated in sequence. As a result, some recorders for punching or perforating data records using a combinational code have been designed to sequence the operation of the punches, frequently using a clock cycle, so as to reduce the peak power requirements of the unit. However, these units require a control for each punch element to be scanned to determine whether or not operation of the associated punch is required by the code or data entry to be recorded. This means that the period required to record each entry is the time required to access or scan each punch input point. Since the data entry generally requires the operation of less than all of the punch elements, the operating cycle of the punch unit could be substantially reduced if only the input points associated with punches requiring operation could be scanned with the intervening input points being skipped.

SUMMARY OF THE INVENTION

The present invention provides a novel arrangement in a plural element recorder for operating in sequence only the recording elements required by the data entry while passing by, without time delay, the recording elements that are not required by the data entry to be recorded. The recorder includes a plurality of bistable circuits in which are stored the bits of a data entry to be recorded.

A series arrangement of logic gates coupled between the bistable circuits and punch control units individual to each of the punch elements steer punch operating signals directly from the control for one punch requiring operation to the control for the next punch requiring operation and passing by any intervening controls in the series arrangement. The punches are operated during successive time periods defined by a clock signal source without requiring interrogation of bistable circuits associated with punch elements that do not require operation. The circuit also includes a monostable circuit for timing the operating period of each punch independent of timing by the logic gates and a logic circuit at the data input to the bistable circuits permitting use of the recorder with different codes.

DESCRIPTION OF THE PREFERRED EMBODIMENT

Figures 1, 2:
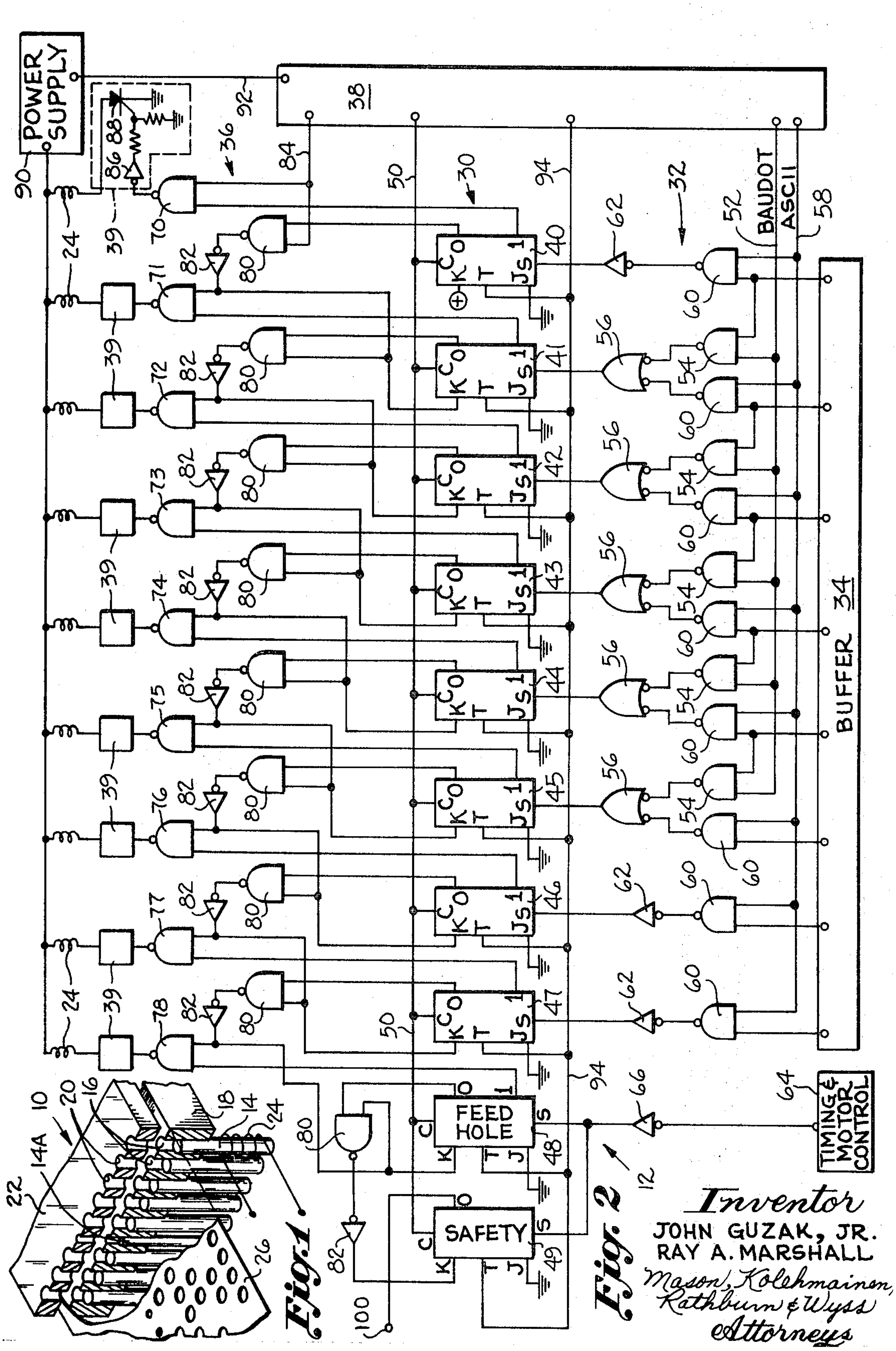
FIG. 1 of the drawing is a perspective view in partial section illustrating a multi-element punching unit for use with the control of the present invention.
FIG. 2 is a schematic circuit diagram of a punch sequencing control circuit embodying the present invention.

Referring now more specifically to FIG. 1 of the drawings, therein is schematically illustrated a plural element recorder or punching unit which is indicated generally as 10 and which is adapted for use with the control circuit 12 (FIG. 2) embodying the present invention. The punch 10 includes a plurality of individual punch elements 14 each slidably mounted within an opening 16 in a block 18 and in alignment with an opening 20 in a female die block 22. Each of the punch elements 14 is provided with an individual operating winding 24 which when suitably energized effects movement of the coupled punch element 14 into the aligned opening 20 to punch or perforate an intervening record 26. In the illustrated unit 10 are provided eight punching elements 14 for recording up to an eight bit code and an additional punch element 14A for perforating a feed hole. The punch unit 10 could, however, be provided with a greater or lesser number of punch elements 14 in dependence on the type of code to be recorded.

If all of the controlling or operating windings 24 for all of the punch elements 14 and 14A were to be simultaneously operated, the power required by the punch unit 10 would be greatly in excess of that required to operate the punch elements in sequence. Accordingly, the control circuit 12 includes means for operating the punch elements 14 required by each data entry in sequence by sequentially energizing the operating windings or controlling windings 24 in a time sequence defined by a timing signal generator or clock pulse source. So as to reduce the time required for a complete operating cycle of the punch unit 10, the circuit 12 includes a series arrangement of logic gates which bypasses the controls for the punches 14 that are not required by a given data entry so that one of the punch elements 14 is operated at each successive clock or timing signal.

In general, the control circuit 12 includes a storage means indicated generally as 30 for storing in parallel form the bits of a data entry to be recorded as well as certain items of control information. This data is supplied to the inputs of the storage means 30 through a data input network indicated generally as 32 from a buffer storage unit 34. The outputs of the bistable circuits 30 control a series circuit arrangement of logic gates indicated generally as 36 to effect operation of the punch elements 14 required by the data entry during successive time cycles defined by clock signals supplied by a control circuit 38. The selective operation of each punch element 14 is controlled by an individual control unit 39 which is enabled or operated under the joint control of the data storage unit 30 and the series arrangement 36 of logic circuits.

Although the control circuit 12 can be constructed using a variety of different components, it is illustrated in FIG. 2 in logic schematic form using a modified diode transistor logic. The storage means 30, for instance, comprises ten JK flip-flops 40–49 for storing respectively eight bits of a coded data entry, a data bit for controlling the production of a feed hole in the record 26, and an overflow or safety bit 49. Each of the flip-flops includes a clear terminal C which in response to the receipt of a more positive or high level signal clears the flip-flop to a condition in which a more positive potential is provided at an output "0" and a more negative potential is provided at an output "1." Each of the flip-flops includes a set input terminal S which when provided with a more positive signal sets the flip-flop to a state in which a more positive potential is applied to the output terminal "1" and a more negative potential to the output terminal "0." The toggle or clock terminal T in each of the flip-flops rasponds to a positive-going pulse to set the flip-flop to a condition determined by the combination of potentials applied to the input terminals J and K. At the end of each recording operation, the control circuit 38 applies a more positive potential to a conductor 50 to clear all of the flip-flops 40–49 to a condition in which a more positive potential is applied to the output terminals "0" and a more negative potential is applied to the output terminals "1."

A data item to be recorded is stored in the flip-flops 40–47 of the storage means 30 under the control of the network 32. If the data item is to be recorded in Baudot code, the five information bits are stored in the buffer 34 to provide a pattern of high and low potentials representing the presence and absence of bits on the first five output leads from the buffer 34 considered from the right in FIG. 2. If the data entry is to be stored in up to an eight bit ASCII code, the data item is stored in the buffer 34 to provide a pattern of high and low potentials representing the presence and absence of data bits on up to all eight of the outputs from the buffer 34. If the data entry is to be stored in Baudot code, the control circuit 38 provides a more positive enabling potential to a conductor 52 to enable one input to each of five NAND gates 54 which steer the bits from the buffer 34 through five NOR gates 56 to the set terminals of five flip-flops 41–45. Alternatively, if the data entry to be recorded is stored in the buffer 34 in ASCII code, an inhibiting potential is applied to the conductor 52 to inhibit the gates 54, and an enabling potential is applied to a conductor 58 to partially enable eight NAND gates 60. The outputs of the gates 60 are coupled either through inventing amplifiers 62 or through the NOR gates 56 to the set terminals of the eight flip-flops 40–47.

If a bit is present in the buffer 34 expressed either in Baudot or ASCII code, the related output terminal of the buffer 34 is at a more positive potential and is effective through one of the gates 54 or 62 to apply a more negative potential to one of the inputs of the NOR gates 56 or one of the inverters 62, thereby applying a more positive potential to the set terminal S of one of the flip-flops 40–47. This sets the related flip-flop so that a more positive potential is provided at its "1" terminal and a more negative potential at its "0" output terminal. The two flip-flops 48 and 49 are always set during each recording operation under the control of a timing and motor control circuit 64 through an inverter 66.

The nine control units 39 for controlling the energization of the windings 24 are partially enabled under the control of the data item stored in the flip-flops 40–48 of the storage means 30 by means of nine NAND gates 70–78. One input of each of these gates is connected to the "1" output terminal of the flip-flops 40–48, respectively. The other inputs to the gates 70–78 are sequentially enabled by the series arrangement 36 of logic gates.

This series arrangement 36 includes a NAND gate 80 and an inverter 82 connected between one input on each pair of adjacent gates. For example, the output of the first gate 80 is connected through the inverter 82 to one input of the gate 71, and one input of the gate 80 is connected to one input to the gate 70. The other input to the gate 80 is connected to the "0" output terminal of the first flip-flop 40. The output of the inverter 82 which is connected to one input of the gate 71 is also connected to the input of the next gate 80 and the K input terminal of the next flip-flop 41 in the storage means 30. The series arrangement of the gates 80 permits the circuit 12 during a cycle of operation of the recorder 10 to bypass the control units 39 associated with punch elements 14 that are not to be operated and to move directly along the sequence of flip-flops 40–49 from one flip-flop which requires the operation of its associated punch directly to the next flip-flop whose punch element 14 requires operation.

More specifically and assuming that the data entry stored in the storage means 30 requires the operation of the first and third punch elements 14 so that the flip-flops 40 and 42 are set but the second flip-flop 41 in the series in reset, the set flip-flops 40 and 42 apply an enabling potential to one input of each of the gates 70 and 72. The "1" output terminal from the flip-flop 41, however, applies an inhibiting potential to one input of the gate 71. The circuit 12 remains in this condition until a cycle of operation of the recorder 10 is initiated. At this time, the control circuit 38 applies a more positive enabling potential to a start conductor 84 which partially enables the first gate 80. The other input to the gate 80 is inhibited by the more negative potential supplied from the "0" output terminal of the set flip-flop 40. The more positive potential applied to the conductor 84 completes the enabling of the gate 70 so that its output drops to a more negative potential to advise the first control unit 39 that the related winding 24 is to be energized to operate the associated first punch element 14.

The control circuit 39 includes an inverter 86, the output of which rises to a more positive potential when the connected gate 70 is fully enabled. When the output of the inverter 86 rises to a more positive potential, gate current is supplied to a silicon controlled rectifier 88 to condition this rectifier for conduction. The cathode of this rectifier is connected to a source of reference potential such as ground, and the anode is connected in series with the winding 24 for the first punch element 14. The other terminal of the winding 24 as well as all of the remaining windings 24 is connected to a controlled power supply circuit 90. The power supply circuit includes a monostable circuit for connecting all of the windings 24 to a source of positive potential for a fixed period of time. The monostable circuit in the power supply circuit 90 is supplied with a synchronizing start signal from the control circuit 38 over a conductor 92 at the repetition rate at which the individual punch elements 14 of the recorder 10 are to be operated. When the monostable circuit in the power supply circuit 90 is triggered, the application of a more positive potential to the winding 24 places the rectifier 88 in only the first control circuit 39 in conduction so that the winding 24 is energized to actuate the coupled punch element 14. The remaining control units 39 are not operated because of the absence of a gate current for the rectifiers 88 in these remaining control units.

The control circuit 38, as indicated above, includes a clock pulse or time base signal generator for synchronizing the sequential operation of the punch elements 14. This generator applies a momentary positive-going pulse to a conductor 94 in synchronism with the signal applied to the conductor 92. The conductor 94 is connected in common to the toggle or clock input terminal T of all of the flip-flops 40–49. When the first pulse is applied to the conductor 94, the settings of the flip-flops 41–49 are not affected inasmuch as all of the J input terminals are returned to a reference potential such as ground, and all of the K input terminals are also returned to the same reference potential at the outputs of the plurality of inverters 82. The K input terminal of the first flip-flop 40, however, is returned to a more positive potential, and the first positive-going pulse applied to the conductor 94 resets the previously set flip-flop 40 so that its "1" output terminal drops to a more negative potential, and its "0" terminal rises to a more positive potential. The more negative potential derived from the "1" output terminal of the flip-flop 40 inhibits the gate 70 and thus removes a source of gate current for the rectifier 88 in the control unit 39 for the first punch element 14. The more positive potential derived from the "0" output terminal of the flip-flop 40 completes the enabling of the first gate 80 so that its output drops to a more negative potential and is forwarded through the inverter 82 to apply a more positive potential to the K input terminal of the next flip-flop 41 and to apply one enabling potential to the input of the gate 71.

Since the second punch element is not to be operated, the flip-flop 41 is in a reset state at this time, and its "1" output terminal applies an inhibiting potential to one input of the gate 71. Thus, the gate 71 is not enabled. However, with the flip-flop 41 in a reset state, the more positive potential from its "0" output terminal combined with the more positive potential from the output of the first inverter 82 completes the enabling of the gate 80 associated with the flip-flop 41, and the more negative output potential from this enabled gate is forwarded through the connected inverter 82 to enable the right-hand input to the gate 72. Since the flip-flop 42 is set in the illustrative example referred to above, the "1" output terminal of the flip-flop 42 supplies a more positive potential, and the gate 72 is completely enabled. The more negative output derived from the gate 72 is forwarded to the connected control unit 39 to provide gate current for the rectifier 88 therein. Accordingly, when the control circuit 38 supplies an operate signal over the conductor 92 to the monostable circuit in the power supply 90, the winding 24 associated with the control unit 39 connected to the gate 72 is energized to operate the third punch element 14.

When the second positive-going pulse is applied to the conductor 94, the flip-flop 42 is reset in the manner described above, and the series arrangement 36 of logic gates 80 and their coupled inverters 82 extends the enabling potential to the next gate in the group of gates 73–77 associated with a set flip-flop in the group of flip-flops 43–47 representing a punch element 14 that is to be operated. Accordingly, the series arrangement 36 of logic gates permits the punches 14 that are required to be operated by the stored data entry in the storage means 30 to be operated on successive clock pulses applied to the conductor 94 from the signal source in the control circuit 38, and the control circuits 39 associated with reset ones of the bistable circuits 40–47 are bypassed.

The last punch element in the recorder 10 to be operated is the punch element 14A providing the feed hole. The flip-flop 48 is always set during each cycle of operation by the timing and motor control circuit 64 as described above. Accordingly, whenever the last of the punch elements 14 representing intelligence bits has been operated, the series arrangement 36 of logic gates completes the enabling of the gate 78 so that the connected control unit 39 energizes the winding 24 associated with the feed hole punch element 14A. On the next following clock pulse on the conductor 94, the flip-flop 48 is reset, and the last gate 80 in the series arrangement 37 is fully enabled to apply, through the connected inverter 82, a more positive potential to the K input terminal to the safety flip-flop 49. This flip-flop is set on the next following positive-going pulse applied to the conductor 94 and applies a more positive potential to an output terminal 100. The appearance of a more positive potential on the output terminal 100 provides a control signal to the recorder 10 indicating the completion of a cycle of punch-operations. At this time, the control circuit 38 removes the more positive potential from the conductor 84, terminates the application of synchronized timing pulses to the conductors 92 and 94, and applies a momentary positive-going pulse to the conductor 50 to insure that all of the flip-flops 40–49 are reset. The control circuit 12 and the recorder 10 are now in condition to record the next item of information on the record 26.

What is claimed and desired to be secured by Letters Patent of the United States is:

1. In a recorder having a plurality of independently operable recording elements, a plurality of control units each adapted to control the operation of one of the recording elements, a series arrangement of logic gates coupled to the control units for extending an operating signal to the control units in a given sequence, a plurality of bistable circuits each coupled to one of the logic gates, the bistable circuits being operable to alternate first and second states to store a data item to be recorded, a bistable circuit in one of said states inhibiting the coupled logic gate to interrupt the extension of said operating signal over the series arrangement and a bistable circuit in the other of said states enabling the coupled logic gate to extend said operating signal over said series arrangement, and means coupled to the bistable circuits for placing all of the bistable circuits in said other state in sequent to operate selected ones of the control units in said given sequence.

2. In combination with a recorder having a plurality of recording means, an output control unit each adapted to control one of the recording means, a pluarlity of data storage units each coupled to one of the output control units and each adapted to store an indication that a recording means is to be operated, input means for storing said indications in the data storage units, a timing signal source providing repetitive signals defining successive time periods, and a plurality of logic gates connected in a series arrangement and controlled by the data storage units and the repetitive signals for operating different ones of only the output control units coupled to the data storage units storing said indications during consecutive ones of said time periods.

3. In a recorder having a plurality of independently operated recording elements, a plurality of signal responsive control means each coupled to one of the recording elements to control its operation, a plurality of logic gates coupled to each other in a series arrangement, a plurality of bistable circuits operable to a pattern of set and reset states in accordance with a coded representation of a data item to be recorded, first circuit means individually coupling each of the bistable circuits to one of the logic gates to enable a logice gate when the coupled bistable circuit is reset and to inhibit the logic gate when the coupled bistable circuit is set, the continuity of the series arrangement of logic gates being interrupted by an inhibited gate, second circuit means coupling one logic gate and one bistable circuit to each output means for controlling its operation, third circuit means for applying an operating signal to the input of the series arrangement of logic gates to operate the control means selected by the first inhibited logic gate, and means for placing the set bistable circuits in a reset state in sequence as each control means is operated so that the inhibited logic gates are enabled in sequence and the signal provided by the third circuit means is extended over to the series arrangement of logic gates in sequence to control the operation of the control means selected by the next inhibited logic gate in the series arrangement.

4. The recorder set forth in claim 3 including
a source of signals representing a data item to be recorded,
a second plurality of logic gates coupled between the signal source and the bistable circuits for storing the data item in the bistable circuits by setting the bistable circuits to a pattern of set and reset conditions representing the data item to be recorded,
and a control circuit coupled to the second plurality of logic gates for selectively enabling different ones of the second plurality of logic gates to permit the same data item to be stored in the bistable circuits expressed in different codes.

5. The recorder set forth in claim 3 including
an additional bistable circuit,
means for setting the additional bistable circuit each time that a data item is stored in the plurality of bistable circuits,
and means controlled by the logic gates for resetting the additional bistable circuit after the completion of the operation of the control means to provide an indication that the operation of the recording elements has been completed.

6. In combination with a recorder having a plurality of recording means,
a plurality of output control units each adapted to control the operation of one of the recording means,
a plurality of data storage units each coupled to one of the output control units and each adapted to condition the coupled output control unit for operation when a record indication is stored in the data storage unit,
means for storing record indications in a combination of the data storage units representing a data item to be recorded,
a steering circuit for operating in a sequence only those of the output control units conditioned by the data storage units, said steering circuit including a plurality of logic gates connected in series with the output of each logic gate coupled to the next logic gate in the series and to one of the output control units,
and means controlled by the data storage units for selectively enabling the logic gates.

7. In combination with a recorder having a plurality of electrically controlled recording means,
a plurality of bistable circuits each operable between first and second states and normally in a first state,
input means for operating the bistable circuits to a combination of first and second states representing a data item to be recorded,
a plurality of output control units for controlling the recording elements,
a plurality of logic gates connecting the output control units in a series arrangement,
a network coupled to the bistable circuit, the logic gates, and the output control unit for selecting the output control units for sequential operation in the sequence determined by the series arrangement of the logic gates and in accordance with the states of the bistable circuits,
and a timing signal source coupled to the network and supplying periodic signals to the network, the network being controlled by the periodic signals to operate a different selected output control unit for each periodic signal received.

8. In combination with a recorder having a plurality of electrically controlled recording means, a plurality of bistable circuits each operable between first and second states and normally in a first state,
input means for operating the bistable circuits to a combination of first and second states representing a data item to be recorded,
a plurality of output logic gates each coupled to and controlled by one of the bistable circuits for controlling one of the recording means,
a plurality of steering logic gates connected in a series arrangement and coupled to the output logic gates to enable the output logic gates in sequence, each of said steering logic gates being coupled to and controlled by one of the bistable circuits to interrupt the continuity of the series arrangement of steering logic gates at each bistable circuit requiring the control of a recording means,
and a control circuit coupled to all of the bistable circuits for returning the bistable circuits from second to first states in sequence so that the bistable circuits and steering logic gates enable in sequence only the output logic gates for the recording elements requiring control.

9. In a recorder having a plurality of individually operable recording elements,
a plurality of control units each operable to control the operation of one of the recording elements,
a plurality of bistable circuits operable from a normal reset state to a pattern of set and reset states representing a data item to be recorded, the set state of a bistable circuit representing the operation of a recording element,
first circuit means coupling each of the bistable circuits to one of the control units to partially condition the control unit for operation when the coupled bistable circuit is set,
a plurality of logic gates connected in a series circuit, said logic gates each having an output coupled to a control unit to operate the control unit when the control unit has been partially conditioned and when the coupled logic gate is enabled, said logic gates each including at least one input,
second circuit means coupling the input of each logic gate to one of the bistable circuits, the bistable circuit enabling the coupled logic gate when the bistable circuit is reset and inhibiting the coupled logic gate when the bistable circuit is set,
and third circuit means for operating the set bistable circuits to a reset state in a sequence determined by the logic gates as the coupled control units are operated so that control units are operated in sequence.

10. In combination with a recorder having a plurality of electrically controlled recording means,
a plurality of bistable circuits each operable between first and second states and normally in a first state,
input means for operating the bistable circuits to a combination of first and second states representing a data item to be recorded,
a plurality of output logic gates each having at least two inputs and an output for controlling one of the recording means, one of the inputs to each output logic gate being coupled to one of the bistable circuits to receive an enabling potential when the bistable circuit is in a second state and an inhibiting potential when the bistable circuit is in a first state,
a plurality of steering logic gates each having an output and at least two inputs, one of the inputs to each steering logic gate being coupled to one of the bistable circuits to receive an enabling potential when the bistable circuit is in a first state, the other input to each steering logic gate being coupled to the output of another one of the steering logic gates so that the steering logic gates form a series circuit arrangement, the output of each steering logic gate being coupled to the other input of one of the output logic gates, and means for placing those of the bistable circuits that are in a second state in a first state in sequence so that the output logic gates coupled to the bistable circuit in the second state are enabled in sequence.

11. In a recorder having a plurality of individual recording elements, a plurality of control units each adapted to control the operation of one of the recording elements, a plurality of bistable circuits operable to set and reset states, each of said bistable circuits also including at least one input terminal and a clock terminal for controlling alternation in the state of the bistable circuit, input means for setting the bistable circuits to a pattern of set and reset states representing a data item to be recorded, a plurality of logic gates each having a pair of inputs and an output, the logic gates being serially arranged with the output of each gate coupled to one input of the next gate in the series and with the other input of each gate coupled to one of the bistable circuits, first circuit means coupling each control unit to one of the logic gates and to one of the bistable circuits to operate the control unit when the coupled gate is enabled and the coupled bistable circuit is set, second circuit means coupling the output of each gate to the input terminal of one bistable circuit, the second circuit means supplying a reset signal for conditioning the bistable circuit to be reset, and a signal source coupled to the clock terminals of the bistable circuits for supplying a time spaced series of clock signals to the bistable circuits to place the bistable circuits in a reset state in sequence as reset signals are developed by the logic gates.

12. In a recorder having a plurality of independently operable recording elements, a plurality of windings each adapted to control the operation of one of the recording elements, a plurality of control units each coupled to one of the windings for controlling the energization of the winding, each of the control units including a controlled conduction device having a control electrode and a pair of output electrodes, the output electrodes being connected in series with the winding, a first control circuit coupled to the control units for selectively applying enabling signals to the control electrodes of the controlled conduction devices, said first control circuit including means for applying the enabling signal to the control electrodes in different control units in a time spaced sequence, a potential source, and a second control circuit operable in a synchronized relation with the enabling signals for coupling the potential source across all of the windings and connected controlled conduction devices for a given period of time, said second control circuit including means to couple the potential source across all of the connected windings and controlled conduction devices each time that an enabling signal is applied to a control electrode in anyone of the control units.

13. In a recorder for use with incoming data signals and having a plurality of independently operable recording elements, a plurality of windings each adapted to control the operation of one of the recording elements, predetermined ones of said windings being operated in accordance with each predetermined incoming data signal, and control means coupled to each of said windings and supplied with the data signals for operating only the predetermined windings in direct succession until the recording is complete, said control means including means for automatically skipping the remaining windings to effect recording in a minimum period of time and with minimum power requirements.

14. A method of recording data represented by an incoming data signal, comprising the steps of: providing a plurality of recording elements, providing a plurality of windings each adapted to control the operation of one of the recording elements, and operating only predetermined ones of said windings in direct succession by skipping the remaining windings in accordance with each incoming data signal.

References Cited

UNITED STATES PATENTS

| | | | |
|---|---|---|---|
| 2,964,238 | 12/1960 | King et al. | 234—58 |
| 3,093,303 | 6/1963 | Dirks | 234—108 |

WILLIAM S. LAWSON, Primary Examiner

U.S. Cl. X.R.

234—58, 108, 131